US009489246B2

(12) United States Patent
Olivier et al.

(10) Patent No.: US 9,489,246 B2
(45) Date of Patent: Nov. 8, 2016

(54) METHOD AND DEVICE FOR DETERMINING PARALLELISM OF TASKS OF A PROGRAM

(75) Inventors: Jeffrey V. Olivier, Champaign, IL (US);
Zhiqiang Ma, Platteville, WI (US);
Paul M Petersen, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 13/976,054

(22) PCT Filed: Sep. 30, 2011

(86) PCT No.: PCT/US2011/054454
§ 371 (c)(1),
(2), (4) Date: Jun. 26, 2013

(87) PCT Pub. No.: WO2012/138376
PCT Pub. Date: Oct. 11, 2012

(65) Prior Publication Data
US 2013/0290975 A1    Oct. 31, 2013

Related U.S. Application Data

(60) Provisional application No. 61/471,140, filed on Apr. 2, 2011.

(51) Int. Cl.
*G06F 9/54* (2006.01)
*G06F 9/38* (2006.01)
(Continued)

(52) U.S. Cl.
CPC ............... *G06F 9/54* (2013.01); *G06F 8/458* (2013.01); *G06F 9/3838* (2013.01); *G06F 9/3851* (2013.01); *G06F 9/5066* (2013.01); *G06F 2209/5017* (2013.01)

(58) Field of Classification Search
None
See application file for complete search history.

(56) References Cited

U.S. PATENT DOCUMENTS

| 6,223,281 B1 | 4/2001 | Bird et al. | |
| 2002/0144090 A1* | 10/2002 | Ronen et al. | 712/217 |
| 2003/0037290 A1* | 2/2003 | Price et al. | 714/38 |

(Continued)

FOREIGN PATENT DOCUMENTS

| TW | 200811709 A | 3/2008 |
| TW | 200844864 A | 11/2008 |
| WO | 2012138376 A1 | 10/2012 |

OTHER PUBLICATIONS

International Preliminary Report on Patentability received for International Patent Application No. PCT/US2011/054454, mailed Oct. 10, 2013, 6 pages.

(Continued)

*Primary Examiner* — Emerson Puente
*Assistant Examiner* — Zhi Chen
(74) *Attorney, Agent, or Firm* — Barnes & Thornburg LLP

(57) ABSTRACT

A method and device for determining parallelism of tasks of a program comprises generating a task data structure to track the tasks and assigning a node of the task data structure to each executing task. Each node includes a task identification number and a wait number. The task identification number uniquely identifies the corresponding task from other currently executing tasks and the wait number corresponds to the task identification number of a node corresponding to the last descendant task of the corresponding task that was executed prior to a wait command. The parallelism of the tasks is determined by comparing the relationship between the tasks.

25 Claims, 10 Drawing Sheets

(51) Int. Cl.
  *G06F 9/45* (2006.01)
  *G06F 9/50* (2006.01)

(56) References Cited

U.S. PATENT DOCUMENTS

2008/0244551 A1   10/2008   Jung et al.
2009/0222825 A1    9/2009   Upadhyaya et al.

OTHER PUBLICATIONS

Feng et al., "Efficient Detection of Determinacy Races in Cilk Programs," Proceedings of the Ninth Annual ACM Symposium on Parallel Algorithms and Architectures (SPAA), Jun. 1997, 11 pages.

International Search Report and Written Opinion received for International Patent Application No. PCT/US2011/054454, mailed May 22, 2012, 9 pages.

Ramamoorthy et al., "A Survey of Techniques for Recognizing Parallel Processable Streams in Computer Programs," AFIPS '69 (Fall) Proceedings of the Nov. 18-20, 1969, Fall Joint Computer Conference, 15 pages.

Bernstein, A. J., "Analysis of Programs for Parallel Processing," IEEE Transactions of Electronic Computers, vol. EC-15, No. 5, Oct. 1966, pp. 757-763.

Office Action received for Taiwan Patent Application No. 101110861, mailed Mar. 27, 2014, 7 pages of Office Action including 3 pages of unofficial English translation.

* cited by examiner

```
do_work(int i) {
    for (j=0; j<2; j++) {
        begin_task();
        do_nested_work(j);
        end_task();
    }
    wait_for_all();
    for (j=0; j<2; j++) {
        begin_task();
        do_nested_work(j);
        end_task();
    }
}
for (i=0; i<2; i++) {
    begin_task();
    do_work(i);
    end_task();
}
wait_for_all();
```

FIG. 5

|        | Task ID | Wait ID |
|--------|---------|---------|
| Node 0 | 1       | 1       |
| Node 1 | 2       | 4       |
| Node 2 | 4       | 4       |

FIG. 7

|        | Memory Address | Task List |
|--------|----------------|-----------|
| Node 0 | 0012FF12       | 2, 5, 6   |
| Node 1 | 0012FF3C       | 1         |
| Node 2 | 0012FF55       | 2, 3      |

FIG. 8

| Task ID | Wait ID |
|---|---|
| 1 | 1 |

Task Pointer →

FIG. 9a

| Task ID | Wait ID |
|---|---|
| 1 | 1 |
| 2 | 2 |

Task Pointer →

FIG. 9b

| Task ID | Wait ID |
|---|---|
| 1 | 1 |
| 2 | 2 |
| 3 | 3 |

Task Pointer →

FIG. 9c

| Task ID | Wait No. |
|---|---|
| 1 | 1 |
| 2 | 2 |

Task Pointer →

FIG. 9d

| Task ID | Wait No. |
|---|---|
| 1 | 1 |
| 2 | 2 |
| 4 | 4 |

Task Pointer →

FIG. 9e

| Task ID | Wait No. |
|---|---|
| 1 | 1 |
| 2 | 2 |

Task Pointer →

FIG. 9f

| Task ID | Wait No. |
|---|---|
| 1 | 1 |
| 2 | 4 |

Task Pointer →

FIG. 9g

| Task ID | Wait No. |
|---|---|
| 1 | 1 |
| 2 | 4 |
| 5 | 5 |

Task Pointer →

FIG. 9h

| Task ID | Wait No. |
|---|---|
| 1 | 1 |
| 2 | 4 |

Task Pointer →

FIG. 9i

| Task ID | Wait No. |
|---|---|
| 1 | 1 |
| 2 | 4 |
| 6 | 6 |

Task Pointer →

FIG. 9j

| Task ID | Wait No. |
|---|---|
| 1 | 1 |
| 2 | 4 |

Task Pointer →

FIG. 9k

| Task ID | Wait No. |
|---|---|
| 1 | 1 |

Task Pointer →

FIG. 9l

| Task ID | Wait No. |
|---|---|
| 1 | 1 |
| 7 | 7 |

← Task Pointer

FIG. 9m

| Task ID | Wait No. |
|---|---|
| 1 | 1 |
| 7 | 7 |
| 8 | 8 |

← Task Pointer

FIG. 9n

| Task ID | Wait No. |
|---|---|
| 1 | 1 |
| 7 | 7 |

← Task Pointer

FIG. 9o

| Task ID | Wait No. |
|---|---|
| 1 | 1 |
| 7 | 7 |
| 9 | 9 |

← Task Pointer

FIG. 9p

| Task ID | Wait No. |
|---|---|
| 1 | 1 |
| 7 | 7 |

← Task Pointer

FIG. 9q

| Task ID | Wait No. |
|---|---|
| 1 | 1 |
| 7 | 9 |

← Task Pointer

FIG. 9r

| Task ID | Wait No. |
|---|---|
| 1 | 1 |
| 7 | 9 |
| 10 | 10 |

← Task Pointer

FIG. 9s

| Task ID | Wait No. |
|---|---|
| 1 | 1 |
| 7 | 9 |

← Task Pointer

FIG. 9t

| Task ID | Wait No. |
|---|---|
| 1 | 1 |
| 7 | 9 |
| 11 | 11 |

← Task Pointer

FIG. 9u

| Task ID | Wait No. |
|---|---|
| 1 | 1 |
| 7 | 9 |

← Task Pointer

FIG. 9v

| Task ID | Wait No. |
|---|---|
| 1 | 1 |

← Task Pointer

FIG. 9w

| Task ID | Wait No. |
|---|---|
| 1 | 11 |

← Task Pointer

FIG. 9x

METHOD AND DEVICE FOR DETERMINING PARALLELISM OF TASKS OF A PROGRAM

CROSS-REFERENCE TO RELATED U.S. PATENT APPLICATION

The present application claims priority under 35 U.S.C. §119(e) to U.S. Provisional Patent Application Ser. No. 61/471,140, entitled "METHOD AND DEVICE FOR DETERMINING PARALLELISM OF TASKS OF A PROGRAM," which was filed on Apr. 2, 2011.

BACKGROUND

Sequential programs execute each individual task of the program in sequential order. However, many current computers and computing devices include multi-core technology and are capable of executing multiple tasks of a program in parallel. As such, in order to maximize benefit of the multi-core technology, sequential programs may be parallelized. To do so, the sequential program is reconfigured such that various tasks are executed in parallel with each other. However, parallel programs are more difficult to debug and validate than sequential programs. For example, depending on data dependencies between the tasks, race conditions and/or other non-deterministic conditions can occur if two or more tasks that are executed in parallel attempt to access the same memory location. As such, the parallelism of the various tasks to be executed in parallel must be analyzed.

The various tasks of the sequential program correlate to a set of instructions that may or may not be executed in parallel with one or more other tasks. The program may begin with a root task, which spawns (i.e., initiates) other tasks. Each task may spawn no additional task, one additional task, or multiple additional tasks. A task that spawns another task is typically referred to as the parent task of the spawned task, which is known as a child task. Two tasks with the same parent task are typically referred to as sibling tasks.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 5 is a pseudo-code representation of at least one embodiment of an illustrative sequential program to be parallelized;

FIG. 7 is an illustrative diagram of at least one embodiment of the task data structure used in the method of FIG. 1;

FIG. 8 is an illustrative diagram of at least one embodiment of a memory access data structure used in the method of FIG. 1;

FIG. 9a-9x are illustrative diagrams of at least one embodiment of the task data structure generated during the execution of the method of FIG. 1 on the sequential program of FIG. 7.

DETAILED DESCRIPTION OF THE DRAWINGS

Figure 1:
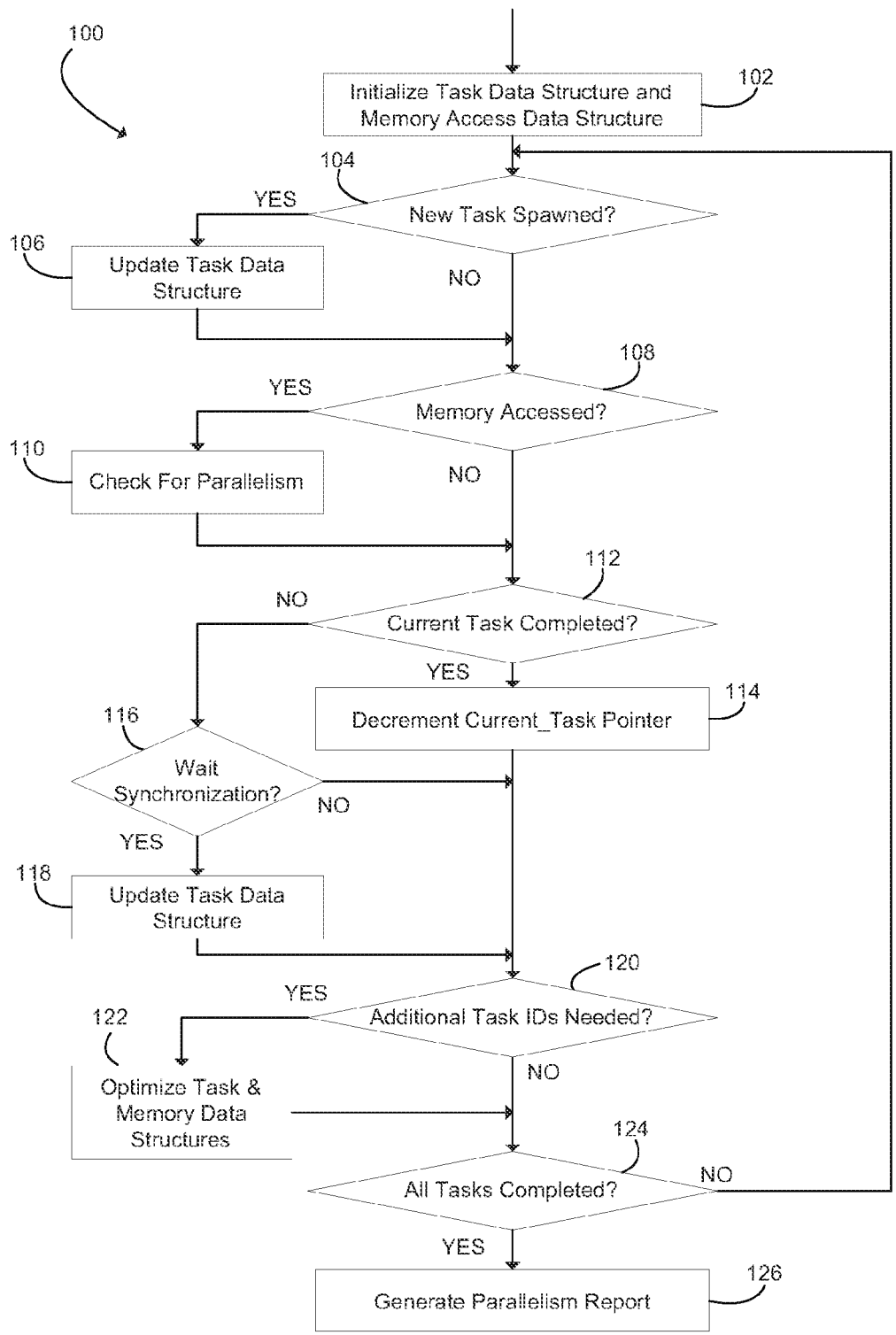
FIG. 1 is a simplified flow chart of at least one embodiment of a method for determining parallelism of tasks of a computer program.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more non-transitory, machine-readable media, which may be read and executed by one or more processors. A non-transitory, machine-readable medium may include any non-transitory mechanism for storing or transmitting information in a form readable by a machine (e.g., a computing device). For example, a non-transitory, machine-readable medium may include any one or combination of read only memory (ROM); random access memory (RAM); magnetic disk storage media; optical storage media; flash memory devices; and others.

As shown in FIGS. 1-4, a method 100 for determining parallelism of various tasks of a computer program may be executed on a sequential program to determine whether two or more tasks of the sequential program can be executed in parallel with each other. As discussed above, a task is a set of instructions that may or may not be executed in parallel with another task (i.e., another set of instructions). In some embodiments, the individual tasks of the sequential program may be identified. For example, depending on the type of program used, the individual tasks may be annotated in the software code of the program. Of course, the method 100 may be used with non-annotated programs as well. In addition to the various tasks, the sequential program may also include one or more wait synchronizations (e.g., a "wait_for_all" synchronization). Such wait synchronizations are used to indicate that all descendant tasks must complete before any subsequent tasks or other code is executed. In some embodiments, an implicit wait synchronization is assumed present at the end of every task such each parent task waits for all of its descendant tasks to complete before completing itself. Additionally, wait synchronizations may occur within the task itself in some embodiments.

Figure 6:
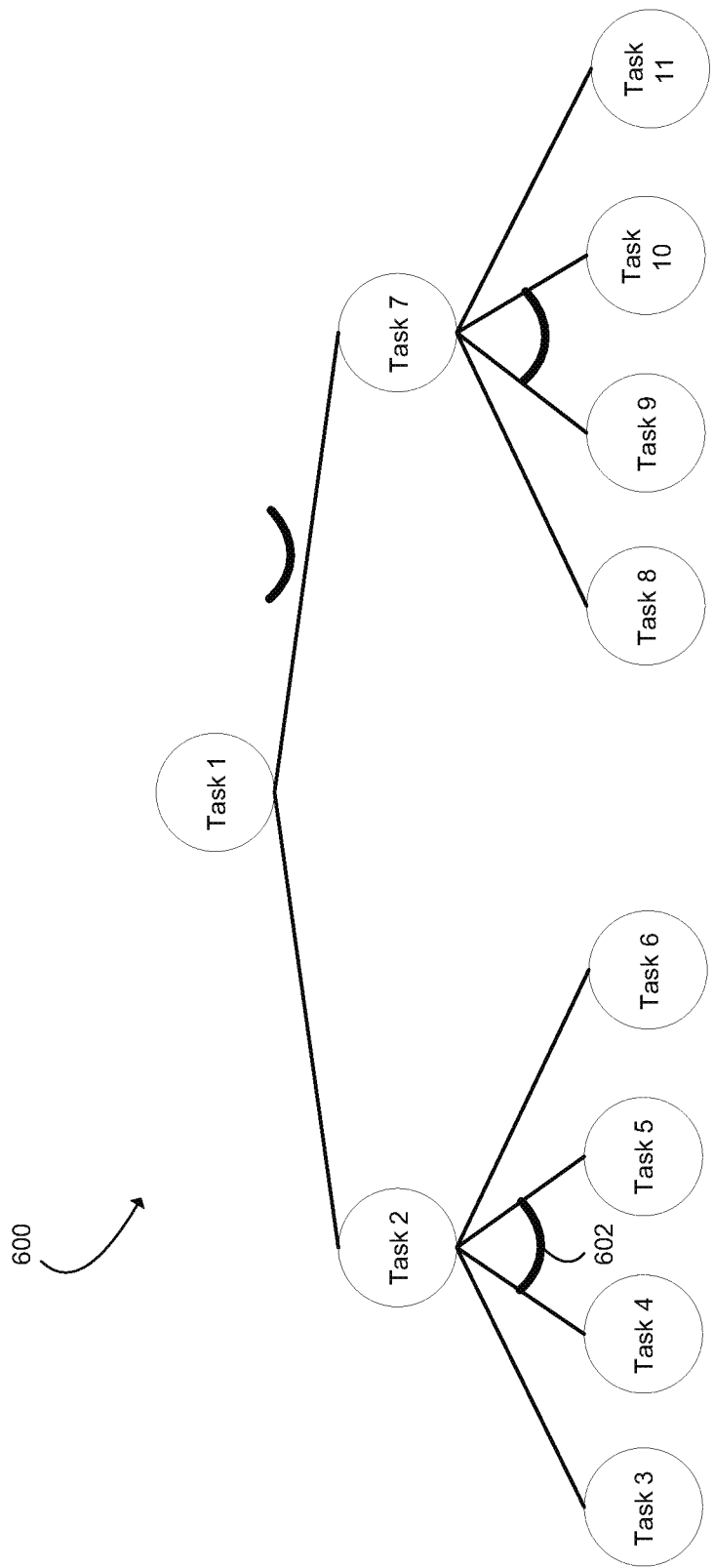
FIG. 6 is a simplified representation of the tasks of the sequential program of FIG. 5.

One example of a sequential, annotated software program 500 that includes a plurality of various tasks, some of which may be executed in parallel, is illustrated in pseudo-code in FIG. 5. The program 500 includes several nested loops and wait synchronizations. Specifically, the illustrative program 500 spawns eleven tasks with three wait synchronizations (i.e., "wait_for_all" synchronizations) interspersed between various tasks. Although the program 500 is a sequential program, some of the tasks of the program 500 may be executed in parallel depending on the data dependencies between the tasks. The execution history of the tasks of the program 500 is illustrated in FIG. 6 as a directed acyclic graph (DAG) 600. As such, each task of the program 500 has been assigned a task identification number ("task ID") based on the order in which the task was spawned. Due to the sequential nature of the program 500, each task is spawned or initiated according to depth first execution and, as such, the associated task IDs are assigned in the illustrative graph 600 in ascending numerical order.

To determine which tasks of the program 500 may be executed in parallel with each other, several features of the graph 600 should be appreciated. First, while a current task is executing, if the task ID associated with another executing task is greater than the task ID of the current task, the other executing task is a descendant (e.g., a child, a grandchild, a great-grand child, etc.) of the current task. For example, task 3 is a descendant (i.e., a child) of task 2 and a descendant (i.e., a grandchild) of task 1. It should be appreciated that a child task can always be executed in parallel with an ancestor task (i.e., the current task) unless the ancestor task has already executed a wait synchronization (i.e., a "wait_for_all") after the completion of the child task. For example, a wait synchronization 602 is implemented in the graph 600 after execution of task 4. As such, the task 4 cannot be executed in parallel with its parent task 2 if task 2 has executed the wait synchronization 602.

It should also be appreciated that, while the current task is executing, the current task cannot be parallel with any portion of an ancestor task that was executed prior to the spawning of the current task by definition. Such feature is ensured by the depth first execution of the sequential program 500 (i.e., a child task is not spawned in a parallel execution prior to the task being spawned in a serial execution). Of course, the current task may be parallel with the portion of an ancestor task that will execute after completion of the current task. Additionally, if two tasks are sibling tasks (i.e., the two tasks do not have an ancestor-descendant relationship), the two tasks can be executed in parallel unless the least common ancestor of both tasks has executed a wait synchronization after the previous task has completed execution. For example, task 3 and 4 are sibling tasks and can be executed in parallel. However, although tasks 4 and 5 are also sibling tasks, task 5 cannot be executed in parallel with task 4 because their least common ancestor, task 2, has executed the wait synchronization 602 after completion of the previous task, task 4, and prior to the spawning of task 5.

Based on the observations of graph 600 described above, only those tasks currently being executed need to be tracked to determine parallelism of tasks. To do so, two data structures are used. A task data structure is used to track the currently executing tasks. One embodiment of a task data structure 700 is illustrated in FIG. 7. The task data structure 700 includes a plurality of records, entries, or nodes 702. Each node 702 corresponds to a task that is currently executing. Illustratively, each node 702 of the task data structure 700 is embodied as a two-dimensional array and is assigned a task ID and a wait number associated with task. As discussed above, each task is assigned a task ID, which uniquely identifies the task corresponding to the respective node from other currently executing tasks. Additionally, each wait number corresponds to the task ID of the last descendant task of the current task that was executed prior to a wait synchronization as discussed in more detail below. As new tasks are spawned, the associated task ID and wait numbers are added to the task data structure 700. Additionally, as tasks complete execution, their associated task ID and wait numbers are removed from the task data structure 700. The currently executing task represented in the task data structure 700 is tracked and identified via use of a current task pointer 704 that points to the node 702 of the current task. Of course, it should be appreciated that other data structures may be used in other embodiments to track the currently executing tasks.

As discussed in more detail below, each historical memory access of each task is also tracked and recorded to identify data dependencies between tasks. To do so, a memory access data structure is used to track which tasks have accessed a particular memory address. One embodiment of a memory access data structure 800 is illustrated in FIG. 8. The memory access data structure 800 includes a plurality of records, entries, or nodes 802. Each node 802 corresponds to a memory address that has been previously accessed by at least one task. Illustratively, each node 802 is embodied as a two-dimensional array and is assigned a memory address and a list of task identification numbers that have accessed the corresponding memory address. As discussed in more detail below, when a task accesses a memory location, the task is compared to other tasks that have previously accessed that memory location to determine whether those tasks can be executed in parallel. Additionally, the task identification number associated with the current task is added to the task list of the accessed memory location. Again, it should be appreciated, that other data structures may be used in other embodiments to track such memory accesses.

Referring now to FIG. 9, the task data structure 700 is shown in FIGS. 9a-9x during various steps of execution of the illustrative program 500. In FIG. 9a, a root task 1 is added to the task data structure 700. The root task is assigned a task ID of 1 and a wait number of 1. In FIG. 9b, task 2 is spawned and added to the task data structure 700. Task 2 is assigned a task ID of 2 and a wait number of 2. In FIG. 9c, task 3 is spawned and added to the task data structure 700. Task 3 is assigned a task ID of 3 and a wait number of 3. In FIG. 9d, task 3 has completed execution and is removed from the task data structure 700. The task pointer is decremented to point to the currently executing task, task 2. In FIG. 9e, task 4 is spawned and added to the task data structure 700. Task 4 is assigned a task ID of 4 and a wait number of 4. In FIG. 9f, task 4 has completed execution and is removed from the task data structure 700. The task pointer is decremented to point to the currently executing task, task 2. In FIG. 9g, task 2 performs the wait synchronization after the completion of task 4 (see FIG. 6). Accordingly, the wait number of task 2 is updated to identify the last descendant task executed before the wait synchronization (i.e., task 4) as discussed above.

In FIG. 9h, task 5 is spawned and added to the task data structure 700. Task 5 is assigned a task ID of 5 and a wait number of 5. In FIG. 9i, task 5 has completed execution and is removed from the task data structure 700. The task pointer is decremented to point to the currently executing task, task 2. In FIG. 9j, task 6 is spawned and added to the task data structure 700. Task 6 is assigned a task ID of 6 and a wait number of 6. In FIG. 9k, task 6 has completed execution and is removed from the task data structure 700. The task pointer is decremented to point to the currently executing task, task 2. In FIG. 9l, task 2 has completed execution and is removed from the task data structure 700. The task pointer is decremented to point to the currently executing task, task 1. In FIG. 9m, task 7 is spawned and added to the task data structure 700. Task 7 is assigned a task ID of 7 and a wait number of 7. In FIG. 9n, task 8 is spawned and added to the task data structure 700. Task 8 is assigned a task ID of 8 and a wait number of 8. In FIG. 9o, task 8 has completed execution and is removed from the task data structure 700. The task pointer is decremented to point to the currently executing task, task 7. In FIG. 9p, task 9 is spawned and added to the task data structure 700. Task 9 is assigned a task ID of 9 and a wait number of 9. In FIG. 9q, task 9 has completed execution and is removed from the task data structure 700. The task pointer is decremented to point to the currently executing task, task 7. In FIG. 9r, task 7 performs the wait synchronization after the completion of task 9 (see FIG. 6). Accordingly, the wait number of task 7 is updated to identify the last descendant task executed before the wait synchronization (i.e., task 9) as discussed above.

In FIG. 9s, task 10 is spawned and added to the task data structure 700. Task 10 is assigned a task ID of 10 and a wait number of 10. In FIG. 9t, task 10 has completed execution and is removed from the task data structure 700. The task pointer is decremented to point to the currently executing task, task 7. In FIG. 9u, task 11 is spawned and added to the task data structure 700. Task 11 is assigned a task ID of 11 and a wait number of 11. In FIG. 9v, task 11 has completed execution and is removed from the task data structure 700. The task pointer is decremented to point to the currently executing task, task 7. In FIG. 9w, task 7 has completed execution and is removed from the task data structure 700. The task pointer is decremented to point to the currently executing task, task 1. In FIG. 9x, task 1 performs the wait synchronization after the completion of task 7 (see FIG. 6). Accordingly, the wait number of task 1 is updated to identify the last descendant task executed before the wait synchronization (i.e., task 11) as discussed above. The program 500 has now completed execution.

As discussed above, the task data structure 700 and the memory access data structure 800 are used to determine those tasks of a sequential program (e.g., program 500) that may be executed in parallel. Upon a memory access by a currently executing task, the currently executing task is compared to other tasks that have previously accessed the same memory location to determine whether the current task can be executed in parallel with the previous task. Depending on the relationship between the two tasks and/or ancestors of the tasks, the parallelism of the tasks can be determined.

Referring again to FIGS. 1-4, the method 100 for determining parallelism of various tasks of a computer program begins with block 102 in which the task data structure 700 and the memory access data structure 800 are initialized, and the memory access data structure is used to track which tasks have accessed a particular memory address. In block 104, it is determined whether a new task has been spawned (i.e., has been initiated). If so, the method 100 advances to block 106 in which the task data structure 700 is updated. That is, the newly spawned task is added to the task data structure 700. To do so, as shown in FIG. 2, a method 200 for updating the task data structure 700 may be executed. The method 200 begins with block 202 in which a current task pointer, Current_Task, is incremented to point to a new node 702 of the task data structure 700. In block 204, the task ID of the current task is set to the next sequential task ID. Additionally, in block 206 the wait number of the current task is set to the next sequential task identification number (i.e., the wait number is set equal to the task ID of the current task). As such, the task data structure 700 is updated to include the task ID number and the wait number assigned to the new task.

Referring back to FIG. 1, after the task data structure 700 has been updated, or if no new task has been spawned, the method 100 advances to block 108. In block 108, it is determined whether the current task has accessed any memory locations. If so, the method 100 advances to block 110 in which the current task is compared to other tasks that have accessed the same memory location to determine whether the current task can be executed in parallel with one or more of the other tasks. For example, referring to FIG. 3, a method 300 for determining parallelism between tasks accessing a common memory location begins with block 302. In block 302, it is determined whether the memory address accessed by the block 322 task has been previously accessed by another task. If not, the method 300 advances to block 316 in which the memory access data structure 800 is updated. That is, a new node 802 is created and the accessed memory location and the task ID of the current task is added to the memory access data structure 800 in the new node.

Referring back to block 302, if the memory address has been previously accessed by another task, the method advances to block 304. In block 304, the next task to have previously accessed the memory location is retrieved from the memory access data structure 800. For example, a variable, Other_task_ID, may be set to equal the task ID of the next task of the relevant memory access list. In block 306, it is determined whether the other task is a descendant (e.g., a child, a grandchild, a great-grandchild, etc.) of the current task. That is, it is determined whether the task ID of the other task is greater than the task ID of the current task. If so, the method 300 advances to block 308. In block 308, it is determined whether the current task waited for the descendant task to complete execution. As discussed above, a task can be instructed to wait for the completion of another task by the insertion of a wait synchronization command (e.g., a wait_for_all command) after the other task. It can be determined whether the current task waited for the descendant task by comparing the task ID of the other task (i.e., the descendant task) to the wait number of the current task as shown in block 308, which is updated in the task data structure 700 as wait synchronization commands are executed as discussed above in regard to FIG. 9.

If the task ID of the other, descendant task is greater than the wait number of the current task, it is determined that the current task did not wait for the descendant task to complete execution and can be executed in parallel with the other, descendant task. As such, the method 300 advances to block 310 in which a parallelism report is updated to indicate that the current task can be executed in parallel with the descendant task. However, if the task ID of the other, descendant task is not greater than the wait number of the current task, it is determined that the current task waited for the other, descendant task to complete execution and cannot be executed in parallel with the descendant task. As such, the method 300 advances to block 312 in which the parallelism report is updated to indicate that the current task cannot execute in parallel with the other, descendant task.

Referring back to block 306, if the other task is determined not to be a descendant of the current task (i.e., the task ID of the other task is not greater than the task ID of the current task), the method 300 advances to block 314. In block 314, it is determined whether the other task is a parent task of the current task. To do so, an ancestor task pointer may be used to "walk up" the task tree data structure 700 starting with the parent of the current task. At each generation level, the task ID of the ancestor task (i.e., the task currently referenced by the ancestor task pointer) is compared to the task ID of the other task. As such, if the ancestor task pointer is pointing to the parent of the current task and the task IDs of the ancestor task and the other task are identical, it is determined that the other task is the parent of the current task.

If the other task is determined to be the parent of the current task, it is determined that the current task cannot be executed in parallel with the other task or that portion of the other task executed prior to the spawning of the current task. As such, the method 300 advances to block 312 in which the parallelism report is updated to indicate that the current task and the other task cannot be executed in parallel. However, if the other task is not the parent of the current task, the method advances to block 316. In block 316, the least common ancestor of the current task and the other task is determined. To do so, the ancestor task pointer is decremented to "walk up" the task tree until the task ID of the other task is greater than the task ID of the task referenced by the ancestor task pointer. At such a point, the task referenced by the ancestor task is an ancestor task to the both the current task and the other task (i.e., the ancestor task is the least common ancestor of the two tasks).

After the least common ancestor task has been determined in block 316, the method 300 advances to block 318 in which it is determined whether the ancestor task waited for the other task to complete execution. To do so, the task ID of the other task is compared to the wait number of the least common ancestor task. If the task ID of the other task is greater than the wait number of the least common ancestor task, it is determined that the least common ancestor did not wait for the descendant task to complete execution. As such, the current task can be executed in parallel with the other task. The method 300, therefore, advances to block 310 in which the parallelism report is updated to indicate that the current task can be executed in parallel with the other task. However, if the task ID of the other task is not greater than the wait number of the least common ancestor, it is determined that the least common ancestor waited for the other, descendant task to complete execution. As such, the current task cannot be executed in parallel with the other task. The method 300, therefore, advances to block 312 in which the parallelism report is updated to indicate that the current task cannot execute in parallel with the other, descendant task.

After the parallelism report has been updated in blocks 310, 312, the method 300 advances to block 320. In block 320, it is determined whether any additional tasks have previously accessed the relevant memory location. That is, it is determined whether any additional task IDs are in the memory list. If so, the method 300 loops back to block 304 in which the next task ID is retrieved from the memory access list. However, if not, the method 300 advances to block 322 in which the memory access data structure 800 is updated with the task ID of the current task.

Figure 2:
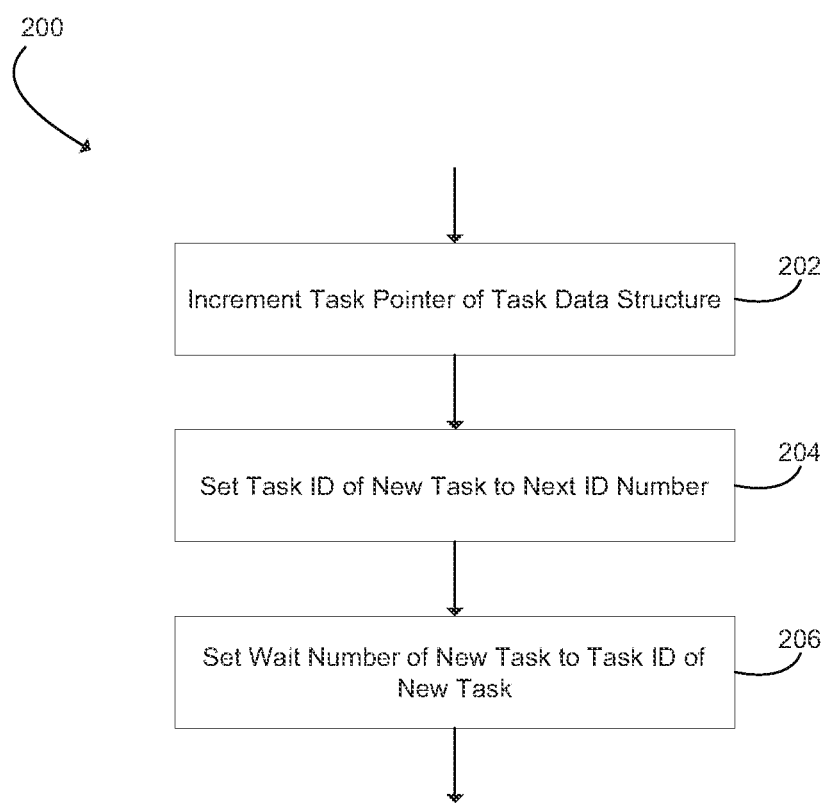
FIG. 2 is a simplified flow chart of at least one embodiment of a method for updating a task data structure used in the method of FIG. 1.
Figure 3:
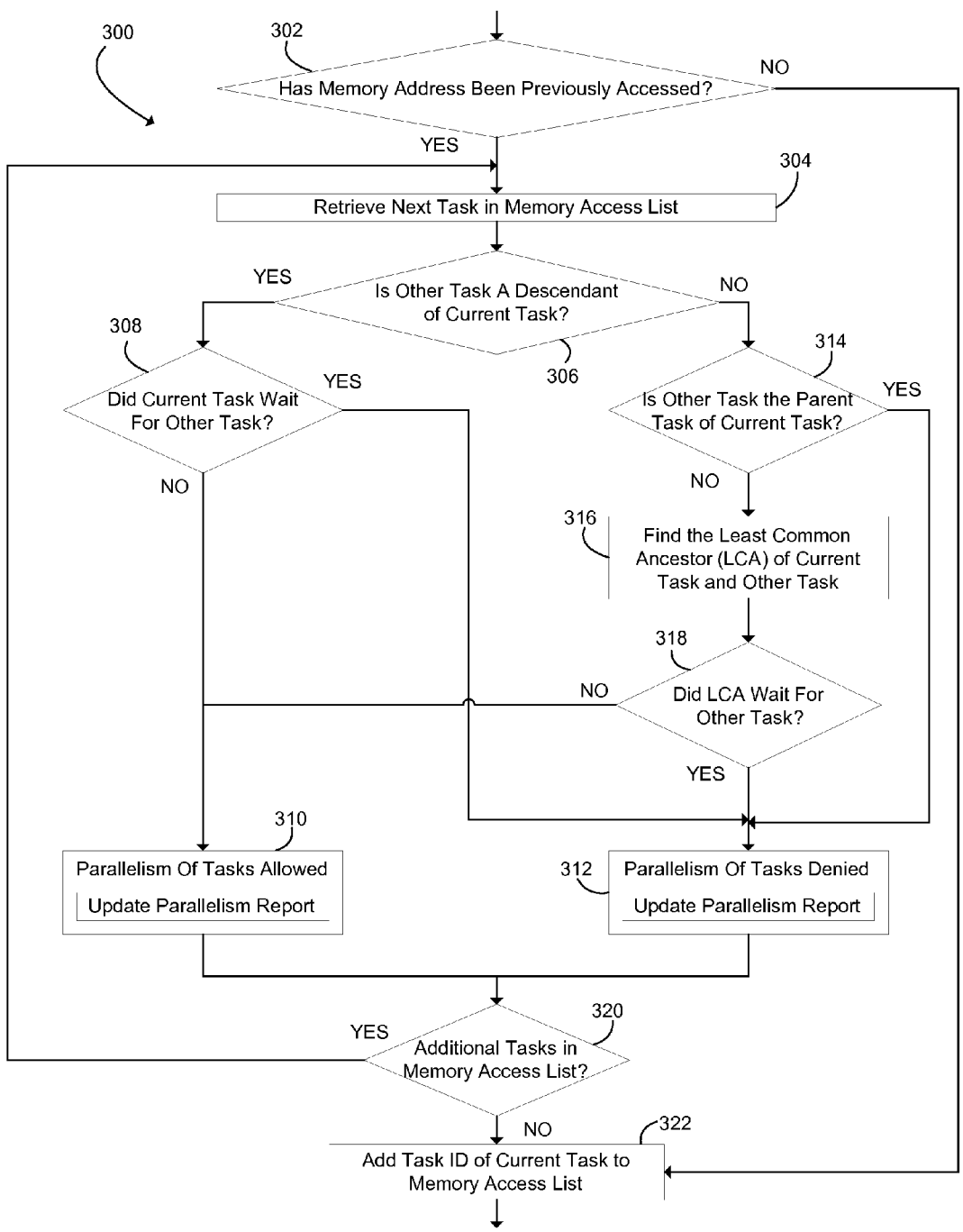
FIG. 3 is a simplified flow chart of at least one embodiment of a method for determining whether two or more tasks can be parallelized.

Referring now back to FIG. 1, after the current task has been checked for parallelism with other task accessing the same memory location, or if the current task has not accessed a memory location, the method 100 advances to block 112. In block 112, it is determined whether the current task has completed execution. If not, the method 100 advances to block 116 in which it is determined whether a wait synchronization is to be executed. A wait synchronization may be executed at any time during a task or after its completion depending on the structure of the program 500. If it is determined that a wait synchronization is to be executed, the wait synchronization is completed and the task data structure 700 is updated in block 118. That is, as discussed above, the wait number of the current task is set to the task ID of the last completed task before the wait synchronization to indicate that the current task must wait for completion of the previous task.

Referring back to block 112, if it is determined that the current task has completed, the method 100 advances to block 114 in which the current task pointer of the task data structure 700. Current_Task, is decremented. After the current task pointer has been decremented in block 114, or after the task data structure 700 has been updated in block 118, the method 100 advances to block 120 in which it is determined whether additional task IDs are needed. That is, during the execution of large programs, the number of task IDs used may increase over time and consume larger amounts of memory resources.

Figure 4:
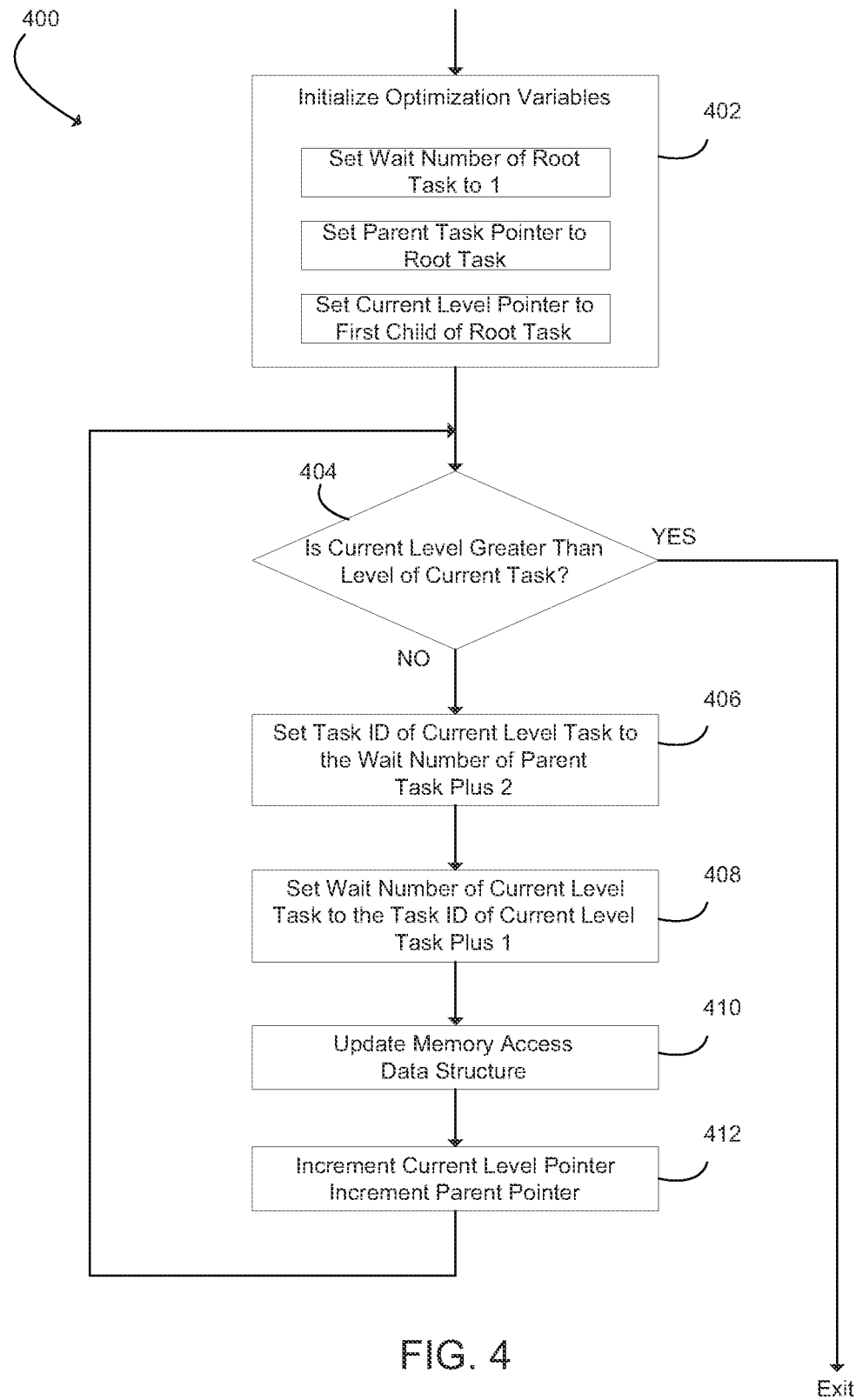
FIG. 4 is a simplified flow chart of at least one embodiment of a method for optimizing the task and memory access data structures used in the method of FIG. 1.

If additional task IDs are required, the task data structure and the memory access data structure may be optimized in block 122. One embodiment of a method 400 for optimizing the task and memory data structures 700, 800 is shown in FIG. 4. The method 400 begins with block 402 in which various optimization variables are initialized. For example, the wait number of the root task of the program is set to one. Additionally a parent task pointer is set to the root task and a current level pointer is set to the first child of the root task. In block 404, it is determined whether the current level is greater than the level of the current task. If so, the method 400 exits. If not, the method 400 advances to block 406. In block 406, the task ID of the task referenced by the current level pointer is set to the wait number plus two of the task referenced by the parent task pointer. In block 408, the wait number of the task referenced by the current level pointer is set to the task ID of that task plus one. Additionally, in block 410, any corresponding task IDs recorded in the memory access data structure 800 are updated based on the modified task IDs of the task data structure 700. That is, if a task ID is reassigned in the data structure 700, the same task ID is reassigned to the same new task ID in the memory access data structure 800 if it exists there. Subsequently, in block 412, the current level pointer and the parent pointer are incremented. In this way, the task IDs of the current executing tasks are reassigned to reduce the overall number of IDs used.

Referring back to FIG. 1, after the task data structure 700 has been optimized (or if no optimization is required/used), the method 100 advances to block 124. In block 124, it is determined whether all tasks of the program have completed. If not, the method 100 loops back to block 104 in which it is determined whether a new task has spawned. However, if all tasks of the current program have completed execution, the method 100 advances to block 126 in which the parallelism report is generated. As discussed above, the parallelism report may identify those tasks that can be executed in parallel and/or those tasks that cannot be executed in parallel. The parallelism report may be embodied as a physical or virtual report (e.g., the report may be printed or displayed on a display screen).

It should be appreciated that, in the description above, the determination of whether two tasks can be executed in parallel with each other may include determining whether the entirety of the two tasks can be executed in parallel and/or determining whether a particular portion (e.g., a subset of instructions) of one task can be executed in parallel with the entirety of and/or a portion of the other task. For example, in the above parallel analysis of the current task, if the other task is an ancestor task of the current task, the particular portion of the ancestor task of concern in the parallel analysis is that portion of the ancestor task that was executed prior to the spawning of the current task and subsequent to the last wait synchronization. However, if the other task is a sibling task of the current task, the portion of the sibling task of concern in the parallel analysis is the entirety of the sibling task (assuming the sibling task has not been filtered by the least common ancestor check of blocks 316, 318 of FIG. 3). For the current task, the portion of concern in the parallel analysis is that portion of the current task that has been executed subsequent to the last wait synchronization, which may be the entirety of the current task or only a portion thereof.

Figure 10:
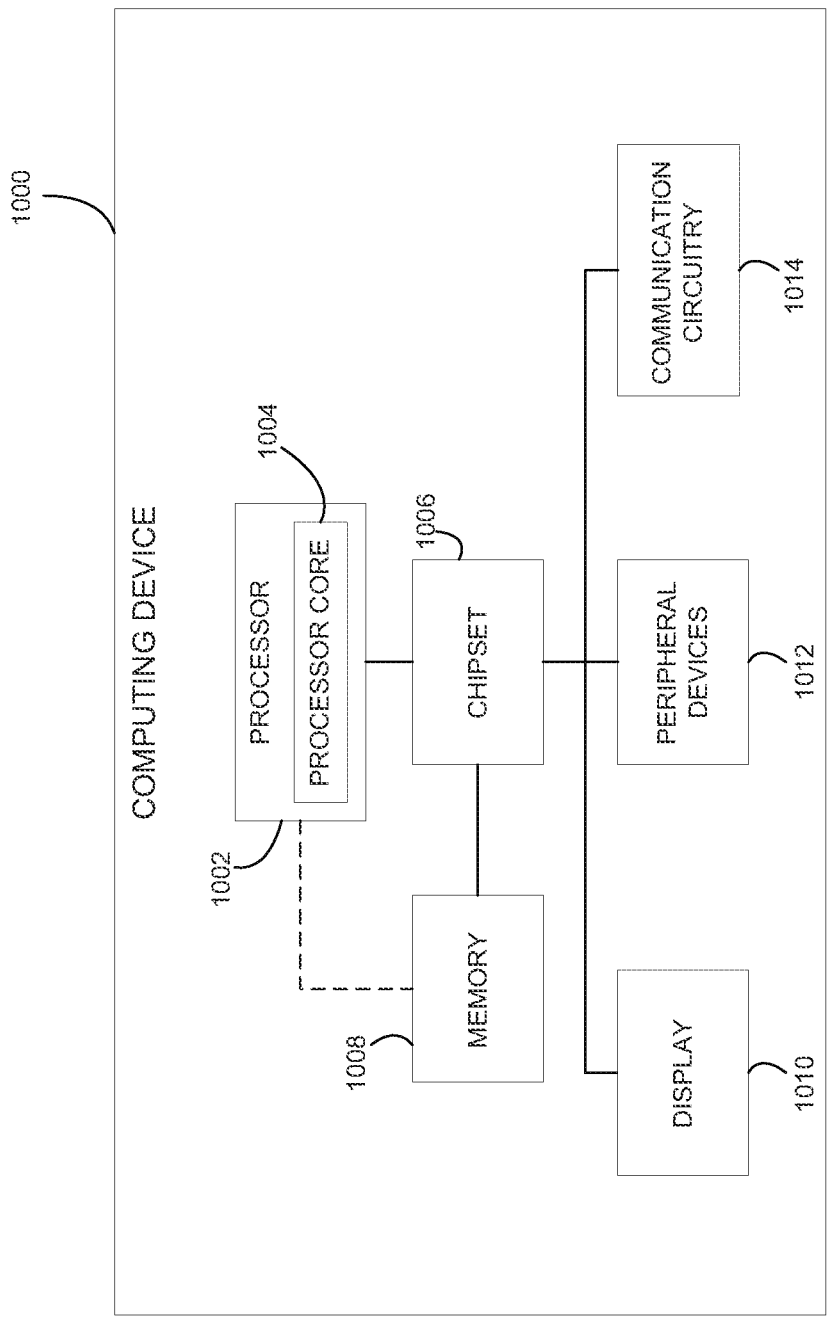
FIG. 10 is a simplified block diagram of at least one embodiment of a computing device to execute the method of FIG. 1.

It should be appreciated that the method 100 may be executed on any type of computing device capable of performing the functions described herein, such as a desktop computer, a laptop computer, a handheld computer, a mobile computing device, or other computer or computing device. For example, one illustrative computing device 1000 is shown in FIG. 10. In the illustrative embodiment of FIG. 10, the computing device 1000 includes a processor 1002, a chipset 1006, a memory 1008, a display 1010, one or more peripheral devices 1012, and communication circuitry 1014. In some embodiments, several of the foregoing components may be incorporated on a motherboard of the computing device 1000, while other components may be communicatively coupled to the motherboard via, for example, a peripheral port. Furthermore, it should be appreciated that the computing device 1000 may include other components, sub-components, and devices commonly found in a computer and/or computing device, which are not illustrated in FIG. 10 for clarity of the description.

The processor 1002 of the computing device 1000 may be embodied as any type of processor capable of executing software/firmware, such as a microprocessor, digital signal processor, microcontroller, or the like. The processor 1002 is illustratively embodied as a single core processor having a processor core 1004. However, in other embodiments, the processor 1002 may be embodied as a multi-core processor having multiple processor cores 1004. Additionally, the computing device 1000 may include additional processors 1002 having one or more processor cores 1004.

The chipset 1006 of the computing device 1000 may include a memory controller hub (MCH or "northbridge"), an input/output controller hub (ICH or "southbridge"), and a firmware device. The firmware device of the chipset 1006 may be embodied as a memory device for storing Basic Input/Output System (BIOS) data and/or instructions and/or other information (e.g., a BIOS driver used during booting of the computing device 1000). However, in other embodiments, chipsets having other configurations may be used. For example, in some embodiments, the chipset 1006 may be embodied as a platform controller hub (PCH). In such embodiments, the memory controller hub (MCH) may be incorporated in or otherwise associated with the processor 1002, and the processor 1002 may communicate directly with the memory 1008 (as shown by the hashed line in FIG. 10).

The processor 1002 is communicatively coupled to the chipset 1006 via a number of signal paths. These signal paths (and other signal paths illustrated in FIG. 10) may be embodied as any type of signal paths capable of facilitating communication between the components of the computing device 1000. For example, the signal paths may be embodied as any number of wires, cables, light guides, printed circuit board traces, via, bus, intervening devices, and/or the like.

The memory 1008 of the computing device 1000 may be embodied as one or more memory devices or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. The memory 1008 is communicatively coupled to the chipset 1006 via a number of signal paths. Although only a single memory device 1008 is illustrated in FIG. 10, in other embodiments, the computing device 1000 may include additional memory devices. Various data and software may be stored in the memory device 1008. For example, one or more operating systems, applications, programs, libraries, and drivers that make up the software stack executed by the processor 1002 may reside in memory 1008 during execution. Furthermore, software and data stored in memory 1008 may be swapped between the memory 1008 and a data storage device of the peripheral devices 1012 as part of memory management operations.

The display 1010 of the computing device 1000 may be embodied as any type of display. For example, the display 1010 may be embodied as a cathode-ray tub (CRT) display, a liquid crystal display (LCD), or other display. Additionally, the display 1010 may be integral with the computing device 1000 or may be a separate peripheral device communicatively coupled with the computing device 1000.

The peripheral devices 1012 of the computing device 1000 may include any number of peripheral or interface devices. For example, the peripheral devices 1012 may include a display, a keyboard, a mouse, one or more data storage devices such as an internal or external hard drive, and/or other peripheral devices. The particular devices included in the peripheral devices 1012 may depend upon, for example, the intended use of the computing device 1000. The peripheral devices 1012 are communicatively coupled to the chipset 1006 via a number of signal paths thereby allowing the chipset 1006 and/or processor 1002 to receive inputs from and send outputs to the peripheral devices 1012.

The communication circuitry 1014 of the computing device 1000 may be embodied as any number of devices and circuitry for enabling communications between the computing device 1000 and other external devices. For example, the communication circuitry 1014 may enable the computing device 1000 to communicate over a network in some embodiments.

As discussed above, the computing device 1000 may be used to execute the method 100 for determining parallelism of various tasks of a computer program. The results of the method 100 may be displayed to a user via the display 1010.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. One or more non-transitory machine-readable storage media comprising a plurality of instructions stored thereon that, in response to execution by a computing device, cause the computing device to:
    generate a task data structure to store data related to a plurality of tasks of a program, the task data structure including at least one node corresponding to a task of the plurality of tasks, each node of the at least one node of the task data structure including a task identification number and a wait number;
    update the task data structure in response to spawning of a first task;
    update the wait number corresponding to the first task to the task identification number of a last descendant task of the first task that was executed and completed prior to a wait synchronization command;
    determine whether the first task has accessed a memory location previously accessed by a second task; and
    determine whether the first task can be executed in parallel with the second task using at least one of (i) the task identification number of the first task and (ii) the wait number of the first task,
    wherein the task identification number uniquely identifies the corresponding task from other currently executing tasks; and
    generate a parallelism report that indicates the first task can be executed in parallel with the second task in response to the determination that the first task can be executed in parallel with the second task.

2. The one or more non-transitory machine-readable storage media of claim 1, wherein to update the task data structure comprises to:
    append a new node to the task data structure, the new node corresponding to the first task;
    assign a task identification number to the new node; and
    assign a wait number to the new node, wherein the wait number of the new node is equal to the assigned task identification number.

3. The one or more non-transitory machine-readable storage media of claim 1, wherein to determine whether the first task has accessed a memory location previously accessed by the second task comprises to access a memory access data structure that correlates memory locations to task identification numbers of tasks that have previously accessed the respective memory location.

4. The one or more non-transitory machine-readable storage media of claim 3, wherein to determine whether the first task has accessed a memory location previously accessed by the second task comprises to determine whether a memory address corresponding to the memory location is present in the memory access data structure.

5. The one or more non-transitory machine-readable storage media of claim 1, wherein to determine whether the first task can be executed in parallel with the second task comprises to:
    determine whether the second task is a descendant task of the first task; and
    in response to the second task being a descendant task of the first task, determine whether the first task waited for completion of the second task.

6. The one or more non-transitory machine-readable storage media of claim 5, wherein to determine whether the first task waited for completion of the second task comprises to determine one of:
    (i) that the first task can be executed in parallel with the second task if the first task did not wait for completion of the second task, or
    (ii) that the first task cannot be executed in parallel with the second task if the first task waited for completion of the second task.

7. The one or more non-transitory machine-readable storage media of claim 1, wherein to determine whether the first task can be executed in parallel with the second task comprises to:
    compare the task identification number of the first task to the task identification number of the second task; and
    in response to the task identification number of the second task being greater than the task identification number of the first task, determine one of:
    (i) that the first task can be executed in parallel with the second task if the task identification number of the second task is greater than the wait number of the first task, or
    (ii) that the first task cannot be executed in parallel with the second task if the task identification number of second task is not greater than the wait number of the first task.

8. The one or more non-transitory machine-readable storage media of claim 1, wherein to determine whether the first task can be executed in parallel with the second task comprises to determine whether the first task is a child of the second task.

9. The one or more non-transitory machine-readable storage media of claim 8, wherein to determine whether the first task can be executed in parallel with the second task comprises to determine that the first task and the second task cannot be executed in parallel if the first task is a child of the second task.

10. The one or more non-transitory machine-readable storage media of claim 1, wherein to determine whether the first task can be executed in parallel with the second task comprises to:
    determine a least common ancestor task of the first task and the second task; and determine whether the least common ancestor task has waited for completion of the second task.

11. The one or more non-transitory machine-readable storage media of claim 10, wherein to determine whether the least common ancestor task has waited for completion of the second task comprises to compare the task identification number of the second task to the wait number of the least common ancestor task.

12. The one or more non-transitory machine-readable storage media of claim 11, wherein to determine whether the first task can be executed in parallel with the second task comprises to determine one of:
(i) that the first task can be executed in parallel with the second task if the least common ancestor task has not waited from completion of the second task, or
(ii) that the first task cannot be executed in parallel with the second task if the least common ancestor task has waited for completion of the second task.

13. The one or more non-transitory machine-readable storage media of claim 1, wherein the wait number is equal to the task identification number of one of (i) the corresponding task or (ii) a descendant task of the corresponding task.

14. The one or more non-transitory machine-readable storage media of claim 1, wherein the plurality of instructions further cause the computing device to reassign the task identification numbers of the nodes of the task data structure.

15. A method comprising:
generating a task data structure to store data related to a plurality of tasks of a program, the task data structure including at least one node corresponding to a task of the plurality of tasks, each node of the at least one node of the task data structure including a task identification number and a wait number, wherein each node of the at least one node of the task data structure has a number of ancestors, and wherein a total number of nodes included in the task data structure is linearly proportional to the largest number of the number of ancestors;
updating the task data structure in response to spawning of a first task;
updating the wait number corresponding to the first task to the task identification number of a last descendant task of the first task that was executed and completed prior to a wait synchronization command;
determining whether the first task has accessed a memory location previously accessed by a second task by accessing a memory access data structure that correlates memory locations to task identification numbers of nodes corresponding to tasks that have previously accessed the respective memory location; and
determining, in response to the first task having accessed a memory location previously access by the second task, whether the first task can be executed in parallel with the second task by using at least one of (i) the task identification number of the first task and (ii) the wait number of the first task,
wherein the task identification number uniquely identifies the corresponding task from other currently executing tasks;
generating a parallelism report that indicates the first task can be executed in parallel with the second task in response to the determination that the first task can be executed in parallel with the second task.

16. The method of claim 15, wherein updating the task data structure comprises:
appending a new node to the task data structure, the new node corresponding to the first task;
assigning a task identification number to the new node; and
assigning a wait number to the new node, wherein the wait number of the new node is equal to the assigned task identification number.

17. The method of claim 15, wherein determining whether the first task can be executed in parallel with the second task comprises:
determining whether the second task is a descendant task of the first task; and
in response to the second task being a descendant task of the first task, determining one of:
(i) that the first task can be executed in parallel with the second task if the first task did not wait for completion of the second task, or
(ii) that the first task cannot be executed in parallel with the second task if the first task waited for completion of the second task.

18. The method of claim 15, wherein determining whether the first task can be executed in parallel with the second task comprises determining that the first task cannot be executed in parallel with the second task if the first task is a child of the second task.

19. The method of claim 15, wherein determining whether the first task can be executed in parallel with the second task comprises:
determining a least common ancestor task of the first task and the second task; and
determining whether the least common ancestor task has waited for completion of the second task.

20. The method of claim 19, wherein determining whether the least common ancestor task has waited for completion of the second task comprises comparing the task identification number of the second task with the wait number of the least common ancestor task.

21. The method of claim 20, wherein determining whether the first task can be executed in parallel with the second task comprises determining one of:
(i) that the first task can be executed in parallel with the second task if the least common ancestor task has not waited from completion of the second task, or
(ii) that the first task cannot be executed in parallel with the second task if the least common ancestor task has waited for completion of the second task.

22. A computing device comprising:
a processor; and
a memory device having stored therein a plurality of instructions, which when executed by the processor, cause processor to:
generate a task data structure to store data related to a plurality of tasks of a program, the task data structure including at least one node corresponding to a task of the plurality of tasks, each node of the at least one node of the task data structure including a task identification number and a wait number;
update the task data structure in response to spawning of a first task;
update the wait number corresponding to the first task to the task identification number of a last descendant task of the first task that was executed and completed prior to a wait synchronization command;
determine whether the first task has accessed a memory location previously accessed by a second task; and
determine in response to the first task having accessed a memory location previously access by the second task, by comparing the task identification number of a node corresponding to the first task to the task identification number of a node corresponding to the second task, wherein the task identification number uniquely identifies the corresponding task from other currently executing tasks;

generate a parallelism report that indicates the first task can be executed in parallel with the second task in response to the determination that the first task can be executed in parallel with the second task.

23. The computing device of claim 22, wherein to determine whether the first task can be executed in parallel with the second task comprises to:

determine whether the second task is a descendant task of the first task; and in response to the second task being a descendant task of the first task, determine one of:

(i) that the first task can be executed in parallel with the second task if the first task did not wait for completion of the second task, or (ii) that the first task cannot be executed in parallel with the second task if the first task waited for completion of the second task.

24. The computing device of claim 22, wherein to determine whether the first task can be executed in parallel with the second task comprises to determine that the first task and the second task cannot be executed in parallel if the first task is a child of the second task.

25. The computing device of claim 22, wherein to determine whether the first task can be executed in parallel with the second task comprises to:

determine a least common ancestor task of the first task and the second task; and determine whether the least common ancestor task has waited for completion of the second task.

* * * * *